United States Patent [19]
Potts

[11] 3,775,660
[45] Nov. 27, 1973

[54] MEANS AND METHODS FOR BATTERY CHARGE RETENTION CIRCUITS

[75] Inventor: Vernon C. Potts, Hazelwood, Mo.

[73] Assignee: Chargematic, Inc., Chesterfield, Mo. 63017

[22] Filed: July 10, 1972

[21] Appl. No.: 269,998

[52] U.S. Cl. ................................. 320/23, 320/37
[51] Int. Cl. ............................................. H02j 7/02
[58] Field of Search.......................... 320/23-23, 320/31, 33, 37, 38, 39, 40, 11

[56] References Cited
UNITED STATES PATENTS
2,650,339  8/1953  Christie et al. ................... 320/33
2,502,729  4/1950  Klinkhamer ....................... 320/22

Primary Examiner—J. D. Miller
Assistant Examiner—Robert J. Hickey
Attorney—Joseph A. Fenlon, Jr.

[57] ABSTRACT

This invention comprises a circuit in which a battery charge is maintained by a continuous supply of half-wave rectified alternating current of small magnitudes, utilizing the same components that were utilized to obtain a charge in the battery by placing one of the rectifying diodes in series with a high impedance timing motor and completing the current path through the battery terminals when the charging circuit is inoperative.

2 Claims, 1 Drawing Figure

PATENTED NOV 27 1973 3,775,660
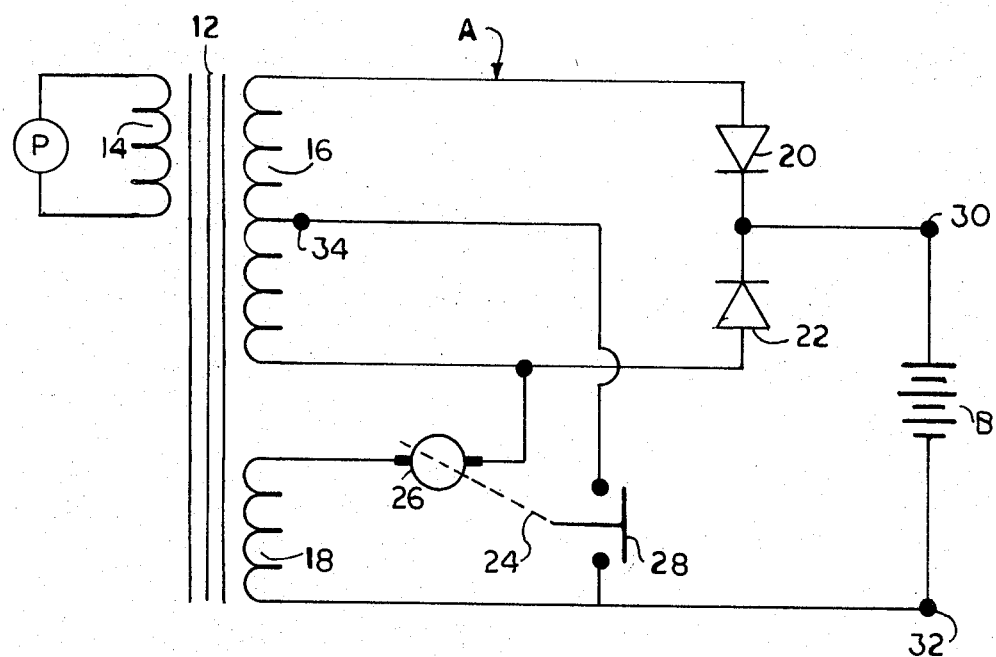

MEANS AND METHODS FOR BATTERY CHARGE RETENTION CIRCUITS

It is the object of this invention to provide a unique and novel charge retention circuit.

With the above and other objects in view which will become immediately apparent upon reading the Specification and examining the drawing, my invention resides in the unique and novel form, construction, arrangement, and combination of the various parts shown in the drawing, described in the Specification and claimed in the claims.

IN THE DRAWINGS

The FIGURE represents an electrical schematic of a preferred embodiment of my invention.

Referring now in more detail and by reference character to the drawing which illustrates a preferred embodiment of my invention, A designates a charge retention circuit comprising a transformer 12 having a primary winding 14 connected to a source of power P and two secondary windings 16 and 18; a pair of rectifying diodes 20, 22, connected across the secondary winding 16 with their respective cathodes being connected in common; a timer 24 having a high impedance motor winding 26 and a set of contacts 28 which remain normally closed while the timer is in operation but which open after the timer 24 has been running the predetermined period of time and turns itself off; and a pair of battery terminals 30, 32, to which are respectively connected the positive and negative terminals of the battery B.

The secondary winding 16 is provided with a centertap 34 which is connected to the negative terminal 30 and to one leg of the other secondary winding 18. The motor winding 26 is connected in series with the other leg of the secondary winding 18 and with one leg of the secondary winding 16. The positive terminal 30 is connected to the common anode connection of the diodes 20, 22, and the timer contacts 28 are connected in series between the centertap 34 and the negative terminal 32, all as shown in the drawing.

In operation, the timer 24 is manually preset to operate a predetermined period of time depending upon the charge status of the battery B which is connected across the battery terminals 30 and 32. The timer 24 is actuated manually which closes the contacts 28 and completes a circuit between the secondary winding 18, the timer motor winding 26, one-half of the center winding 16 and the closed timer contacts 28. The secondary winding 16 and 18 are connected so that the voltage developed across the two windings is additive and the combined voltage of the two windings is sufficient to cause operation of the timer motor 26 for the preselected period of time through the closed contacts 28. The closing of the contacts 28 also completes the charging circuit for the battery B, and causes charging current of substantial magnitude to flow through the battery B and back through the contacts 28 to the centertap 36. When the timer motor 26 has run its full period of time, and the battery B has become fully charged, the contacts 28 are opened and charging current is immediately stopped. However, it should be noted that opening of the contacts 28 does not completely stop the flow of electrical current through the charge retention circuit. A circuit still exists between the secondary winding 18, the timer motor winding 26, the diode 22 and the batter B, all connected in series.

It should be noted that the voltage developed across the winding 18 is not sufficient to cause the timer motor 26 to operate, but a current still will flow. And the voltage developed across the secondary winding 18 will be in series with the high impedance secondary winding 26 of the timer 24, the diode 22 and the battery B. The high impedance winding 26 functions as a current limiting device and the diode 22 passes half-wave rectified current of small magnitude through the battery B and back to the secondary winding 18.

It has been found that the small amounts of current developed in the charge retention circuit in the manner above shown preserves indefinitely the charge of each cell between 2.15 volts and 2.20 volts and prevents gassing of and sulfation of the battery solution. It has been further found that this unique and novel approach of preserving battery charge permits batteries to remain in storage indefinitely and to retain their charge with a minimum of personal maintenance required by battery charging personnel and utilizing only the equipment used to charge the battery itself.

It has been found that this charging circuit and the principles taught herein are equally adaptable to other chargers having built in regulatory devices for automatically decreasing the time of timer motor operation by monitoring the charge across the battery.

It should be understood that changes and modification in the form, construction, arrangement and combination of various parts and elements shown herein may be made without departing from the nature and principle of my invention.

Having thus described my invention, what I claim and desire to secure by Letters Patent is recited in the following Claims:

1. A battery charge retention device comprising:
   a transformer having a primary winding and first and second secondary windings, the first secondary winding including a centertap;
   first and second diodes having their cathodes connected to each other and having their anodes respectively connected across the opposing legs of the first secondary winding;
   a manually preselectable timer including a high impedance motor winding and a set of normally open contacts which are held in closed position during timer operation;
   positive and negative output terminals, the positive output terminal being connected to the common cathode connection of the two diodes and the positive terminal of a battery, and the negative output terminal being connected to the negative terminal of the battery and to one leg of the second secondary winding;
   the motor winding being connected in series with the other leg of the second secondary winding and the anode of the first diode;
   and the timer contacts being connected in series with the centertap of the first secondary winding and the negative output terminal;
   whereby when the timer is set charging current will flow from the first secondary winding through the diodes to the battery and back through the timer contacts to the centertap, and when the timer is not set charge retention current will flow from the second secondary winding through the high impedance motor winding, the first diode, the battery and back to the second secondary winding.

2. The device of claim 1 in which the first and second secondary windings are connected in such manner that the voltages developed in such windings are additive whereby to cause operation of the timer motor during the period of time the contacts remain closed.

* * * * *